No. 857,789.   PATENTED JUNE 25, 1907.
R. S. CARR.
CORN PLANTER.
APPLICATION FILED OCT. 20, 1904.

Witnesses,
Katherine K. Root
Samuel S. Carr

Robert S. Carr, Inventor,

UNITED STATES PATENT OFFICE.

ROBERT S. CARR, OF OXFORD, OHIO.

CORN-PLANTER.

No. 857,789.  Specification of Letters Patent.  Patented June 25, 1907.

Application filed October 20, 1904. Serial No. 229,257.

*To all whom it may concern:*

Be it known that I, ROBERT S. CARR, a citizen of the United States, residing at Oxford, Ohio, have invented a new and useful Improvement in Corn-Planters, of which the following is a specification.

My invention relates to corn planters of the class wherein the usual ground wheels are omitted and the different parts are mounted exclusively on a sled, and the objects of my improvements are to provide a trailing wheel adapted to communicate motion to the seed dropping mechanism; to provide straight bifurcated runners having plane wide soles adapted to pulverize the soil; to provide furrow openers or cutters which are vertically adjustable through the bifurcations or open slots in the runners and also in relation to the fixed seed boxes, and to provide lever mechanism adapted to increase the traction of the trailing wheel and also to simultaneously raise said wheel together with the furrow openers. These objects are attained in the following described manner as illustrated in the accompanying drawings, in which:—

Figure 2:
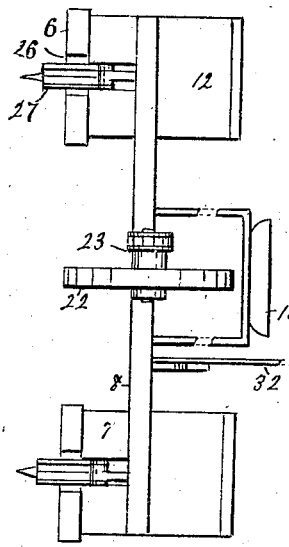
Figure 1:
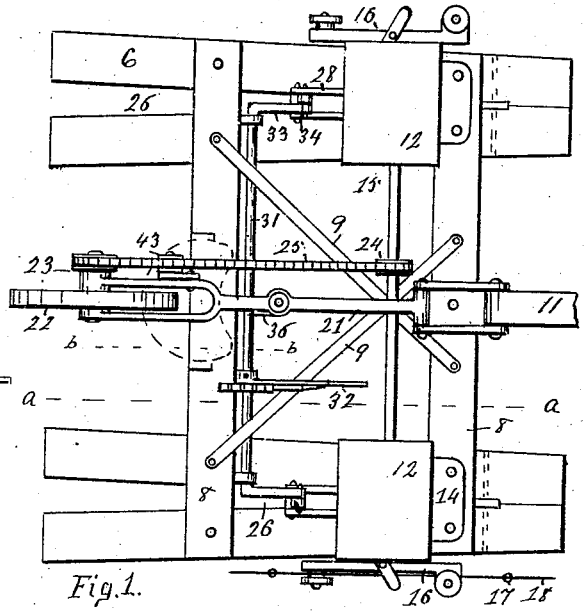
Figure 4:
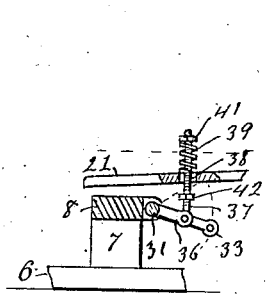
Figure 3:
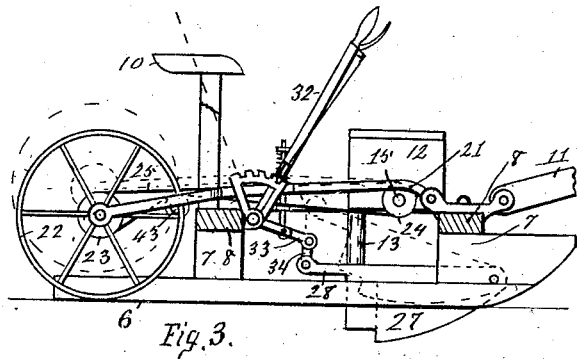
Figure 5:
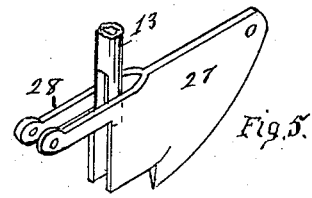

Figure 1, is a plan of a corn planter embodying my improvement; Fig. 2 a rear elevation; Fig. 3 a side elevation with parts in section on the line *a—a* of Fig. 1; Fig. 4 a sectional detail of construction on the line *b—b* of Fig. 1; and Fig. 5 a cutter or shoe in perspective with portions of a seed spout.

In the drawings, 6 represents the straight bifurcated runners, formed with plane wide soles, 7 the knees, 8 the benches, 9 the braces, 10 the seat and 11 the pole of a sled. Seed boxes 12 provided with seed spouts 13 are mounted on the front bench or cross piece 8 and over the respective runners by means of brackets 14. They contain the usual seed dropping mechanism (not shown) which is actuated by an operating or seed shaft 15 to deposit the seed through the spouts in the ordinary manner. Check row attachments 16 are removably secured on the respective seed boxes and are actuated by the knots 17 on a check row wire 18 to impart intermittent motion to the seed shaft which causes the dropping mechanism to deposit the seed in hills, and known as "full hill drop."

Arm 21 is removably hinged at its front end on front bench 8 and trailing or traction wheel 22 and sprocket wheel 23 driven thereby are mounted on its rear end and movable in a vertical plane. Sprocket wheel 24 is secured on the operating or seed shaft and sprocket chain 25 engaging therewith and with wheel 23 imparts continuous rotary motion to said shaft and actuates the dropping mechanism to drill the seed by depositing the grains singly and near together instead of in hills.

The runners are each bifurcated by means of a longitudinal slot 26 closed at the front end and preferably increasing in width rearwardly and open at the rear end. Cutter shoes or furrow openers 27 are each bifurcated at the rear end for the passage therethrough of the seed from the spout and formed with rearwardly projecting arms 28. Said shoes are hinged at their front ends near the front end of the respective runners and are vertically adjustable through the corresponding slots 26 to different depths in the soil when planting or above it when turning the planter at the end of the rows.

Lifting bar 31 mounted to oscillate on the rear bench 8, is formed with arms 33 which engage with arms 28 of the cutters by means of links 34. Hand lever 32 provided with the usual detent catch is secured to said bar and serves to move and maintain the cutters in different positions of vertical adjustment. Arm 36 formed on bar 31 projects in a forward direction a short distance below arm 21 and threaded rod 37 detachably hinged thereon extends in an upward direction through slot 38 formed in said arm 21. Coiled spring 39 adjustable by means of nut 41 encircles rod 37 and exerts a yielding pressure on the top of arm 21 to increase the traction of wheel 22 when the hand lever 32 is thrown forward; when said lever is thrown backward nut 42 adjustable on rod 37 below arm 21 engages with the under side thereof and lifts it with wheel 22 clear of the ground to facilitate the turning of the planter at the ends of the rows, and to simultaneously discontinue the action of the dropping mechanism. Idle wheel 43 adjustably secured on arm 21 serves as a tightener for chain 25 and to support it from contact with the rear bench 8 thereunder.

I am aware that Patent Number 133,808 was granted to W. T. F. Smith Dec. 10, 1872 for improvements on corn planters which were mounted exclusively on sled runners and wherein the seed dropping mechanism was actuated only intermittently and by means of a check wire; I am also aware that Patent Number 158,352 was granted to H.

Bagley Jan. 5, 1875; that Patent Number 227,488 was granted to J. W. Clark May 11, 1880; and that Patent Number 309,894 was granted to G. Symonds Dec. 30, 1884, the three latter patents being for improvements on corn planters, mounted exclusively on sled runners and wherein the seed dropping mechanism was actuated only intermittently and by means of a hand lever. I do not therefore claim any of these specific forms of construction, but What I do claim as my invention and desire to secure by Letters Patent of the United States is:—

1. In a corn planter of the designated class, the combination of a trailing wheel, seed dropping mechanism actuated thereby, cutters movably pivoted at fixed points, and lever mechanism arranged to move and maintain the cutters in different vertical positions, said lever mechanism being also arranged to maintain the trailing wheel in a downward direction under a yielding pressure.

2. In a corn planter of the designated class, the combination of seed dropping mechanism, an arm hinged at a fixed point, a trailing wheel journaled thereon, means adapted to impart motion to seed dropping mechanism from said wheel, cutters hinged at fixed points, and lever mechanism adapted to simultaneously move and maintain the trailing wheel and the cutters in an elevated position.

3. In a corn planter of the designated class, the combination of seed boxes mounted at fixed points, seed dropping mechanism therein, an operating shaft therefor, means adapted to automatically actuate said shaft, cutters hinged at fixed points, and lever mechanism adapted to move and maintain the cutters in different elevated positions.

4. In a corn planter of the designated class, the combination of a sled, seed dropping mechanism exclusively mounted thereon, an operating shaft arranged to actuate said mechanism, an arm removably hinged on the sled, a traction wheel mounted on the arm, lever mechanism mounted on the sled and arranged to move and maintain the wheel in different positions of vertical adjustment and means arranged to communicate motion from the wheel to the operating shaft.

5. In a corn planter, the combination of a sled, dropping mechanism thereon, a traction wheel movable vertically, means arranged to transmit motion therefrom to the said mechanism, a spring arranged to increase the traction of the wheel, and lever mechanism arranged to increase the exertion of the spring and to lift the wheel.

6. In a corn planter of the designated class, the combination of a sled, a traction wheel, seed dropping mechanism actuated thereby and supported exclusively on the sled, vertically adjustable cutters, and lever mechanism mounted on the sled and arranged to simultaneously raise both the cutters and the wheel.

7. In a corn planter of the designated class, the combination of straight bifurcated runners having wide plane soles, cutters hinged at fixed points and vertically movable through the bifurcations in the runners, and lever mechanism mounted at a fixed point above the runners and adapted to move and maintain the cutters in different vertical positions.

8. In a corn planter of the designated class, the combination of furrow openers, a trailing wheel, seed dropping mechanism actuated thereby, and lever mechanism adapted to simultaneously move and maintain the wheel and the furrow openers in different vertical positions.

9. In a corn planter of the designated class, the combination of straight bifurcated runners having wide plane soles, cutters hinged at fixed points and movable through the bifurcations in the runners, stationary seed boxes mounted thereover, spouts depending therefrom, seed dropping mechanism in the boxes, an operating shaft therefor, means adapted to automatically actuate said shaft, and lever mechanism adapted to move and maintain the cutters in different positions of vertical adjustment.

ROBERT S. CARR.

Witnesses:
 KATHERINE K. ROOT,
 SAMUEL S. CARR.